United States Patent [19]

Bianchi et al.

[11] Patent Number: 4,481,086
[45] Date of Patent: Nov. 6, 1984

[54] DISHWASHER WITH ELECTROCHEMICAL CELL

[75] Inventors: Giuseppe Bianchi, Milan; Claudio Milocco, Pordenone, both of Italy

[73] Assignee: Industrie Zanussi S.p.A., Pordenone, Italy

[21] Appl. No.: 444,816

[22] Filed: Nov. 23, 1982

[30] Foreign Application Priority Data

Dec. 14, 1981 [IT] Italy .................. 45739 A/81

[51] Int. Cl.³ .................. D06F 39/02; C25B 1/26
[52] U.S. Cl. .................. 204/78; 204/228; 204/128; 134/11; 134/95; 134/57 D; 68/12 R; 68/207
[58] Field of Search .................. 204/275, 228, 278; 134/56 D, 57 D, 102, 95, 22.13–22.17; 68/12 R, 13 A, 207

[56] References Cited

U.S. PATENT DOCUMENTS

| 3,518,174 | 6/1970 | Inoue | 134/57 D |
| 4,088,550 | 5/1978 | Malkin | 204/95 |
| 4,285,352 | 8/1981 | McMahon et al. | 134/48 |
| 4,402,197 | 9/1983 | Groult et al. | 68/12 R |

FOREIGN PATENT DOCUMENTS

| 2395736 | 3/1979 | France | 134/56 D |
| WO79/00346 | 6/1979 | PCT Int'l Appl. | |
| WO81/01863 | 7/1981 | PCT Int'l Appl. | |
| 1029526 | 8/1964 | United Kingdom | 134/57 D |

Primary Examiner—Brian E. Hearn
Assistant Examiner—Nathan Thane
Attorney, Agent, or Firm—Wenderoth, Lind & Ponack

[57] ABSTRACT

A dish washing machine includes a wash tank for receipt of dishes to be washed and a hydraulic circuit for receiving water from a water supply source and for supplying water to the wash tank. An electrochemical cell for generating chlorine gas by the electrolysis of a brine solution is connected to the hydraulic circuit. A salt container is connected to the hydraulic circuit by at least one valve and forms brine to be supplied to the electrochemical cell. At least one chlorine gas supply conduit connects the electrochemical cell to the wash tank to thereby supply chlorine gas from the electrochemical cell to the interior of the wash tank.

8 Claims, 1 Drawing Figure

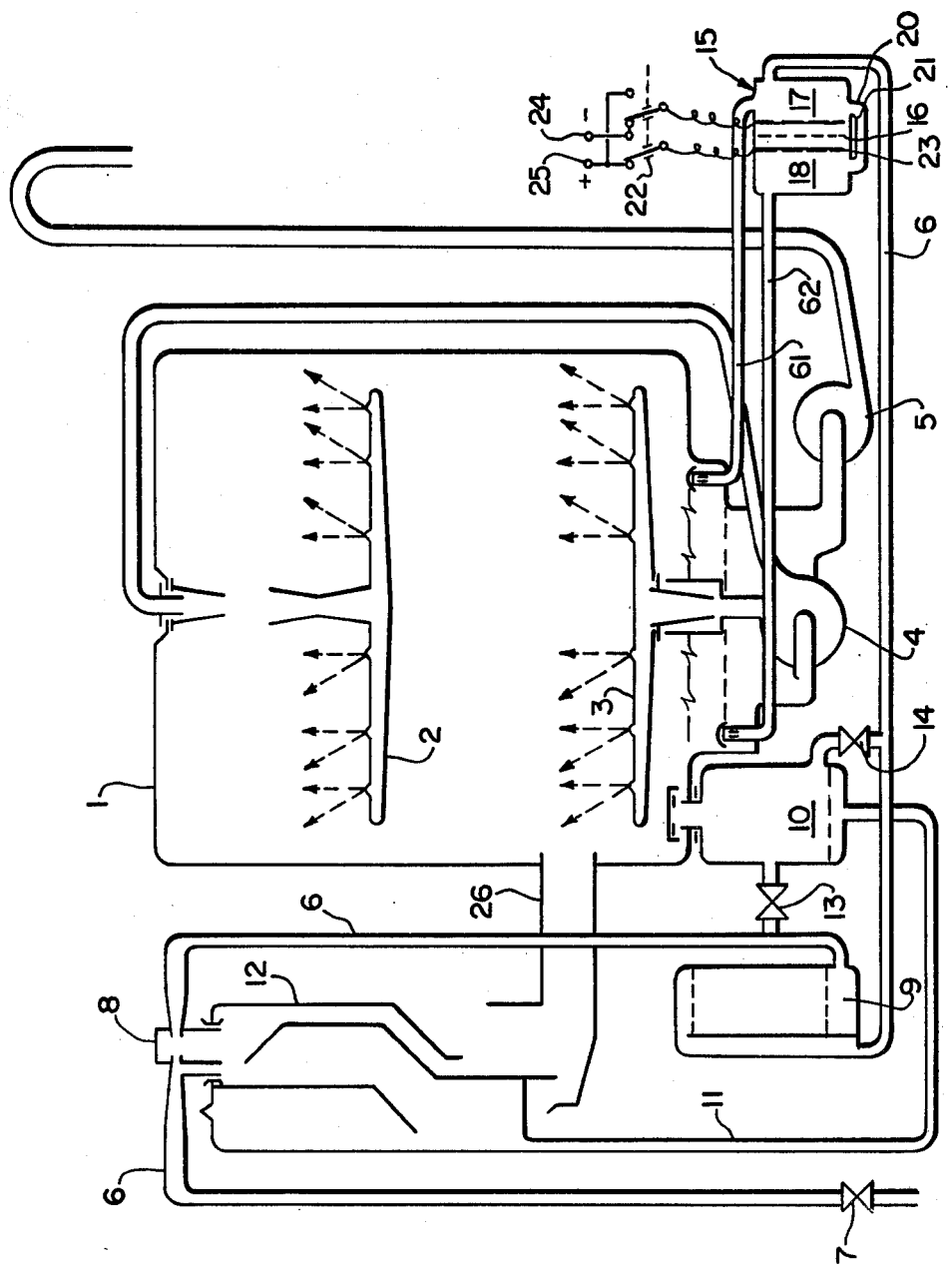

DISHWASHER WITH ELECTROCHEMICAL CELL

BACKGROUND OF THE INVENTION

The present invention relates to a dishwasher, and more particularly to a dishwashing machine of the type for home use and containing an electrochemical cell capable of producing an oxidizing agent for the cleaning and disinfecting of dishes and, at the same time, eliminating disagreeable odors therefrom.

There is known a dishwashing machine wherein a salt container or brine tank can selectively supply brine solution not only to a water decalcifier or softener to achieve regeneration thereof, but also to an electrochemical cell. Electrolysis of sodium chloride solution, i.e. brine, within this electrochemical cell, during brief periods of the operating cycle of the machine, produces sodium hypochlorite which is introduced in measured quantities into the wash tank of the machine by means of a suitable piston driven metering unit. The sodium hypochlorite is diluted in a relatively large quantity of water which is passed into the tank, and the solution is sprinkled onto dishes within the wash tank in order to disinfect the dishes and to complete the cleaning thereof.

Since the sodium hypochlorite, as mentioned above, must be diluted in water, it is necessary that the electrochemical cell produce the sodium hypochlorite during each operating period in precisely the correct amount, i.e. normally a few grams, in order to obtain in the solution formed in the wash tank a sodium hypochlorite concentration sufficient to produce a satisfactory oxidizing effect on the dishes. To accomplish this, the overall dimensions of the electrochemical cell must be inversely proportional to its efficiency.

It is a well known fact that in dishwashers for home use it is very important that the overall dimensions of the various components of the machine be limited so that it is possible to take maximum advantage of the small spaces available exterior of the wash tank of the machine. However, in the above discussed prior art types of machine, the use of a large electrochemical cell is necessary since the efficiency of an electrochemical cell for the production of sodium hypochlorite decreases considerably when, during electrolysis therein, temperatures slightly above ambient room temperatures are achieved. This problem could be solved by taking measures to cool the electrochemical cell. However, the provision of a cooling device to achieve temperature control of the electrochemical cell not only would increase the size of the overall machine, but also would complicate the construction of the machine. Additionally, a solution of water and sodium hypochlorite is alkaline so that, as is well known, the sodium hypochlorite cannot produce a fully satisfactory oxidizing effect on the dishes.

However, the main disadvantage of the above discussed prior art type of dishwashing machine is due to the fact that the sodium hypochlorite solution introduced into the wash tank inevitably contains sodium chloride which, as is well known, creates considerable corrosion problems.

A further disadvantage of the above discussed prior art type of machine results from incrustations formed on the electrodes of the electrochemical cell as a result of repeated electrolysis operations by the cell. Over the course of time, such incrustations can prevent the cell, and thus the dishwashing machine, from functioning properly.

SUMMARY OF THE INVENTION

With the above discussion in mind, it is an object of the present invention to provide a dishwashing machine which overcomes the above and other prior art disadvantages.

A further object of the present invention is to provide such a dishwashing machine which is equipped with a relatively small electrochemical cell capable of producing an oxidizing agent which, even when used in small quantities, produces an optimum effect on the dishes being washed in the machine without leading to structural or functional complications of the dishwasher itself.

An even further object of the present invention is to provide such a dishwashing machine equipped with such an electrochemical cell whereby, during the use thereof, the problems created by incrustation and corrosion are practically eliminated.

These objects are achieved in accordance with the present invention by the provision of a dishwashing machine including a wash tank for the receipt of dishes to be washed, a hydraulic circuit for receiving water from a water supply source and for supplying the water to the wash tank, an electrochemical cell for generating chlorine gas by the electrolysis of a brine solution, the electrochemical cell being connected to the hydraulic circuit, a brine tank connected to the hydraulic circuit by at least one electrovalve for forming brine and supplying brine to the electrochemical cell, and at least one chlorine gas conduit connecting the electrochemical cell to the wash tank for supplying chlorine gas from the electrochemical cell to the interior of the wash tank. The electrochemical cell is fed with predetermined measured quantities of brine.

The machine of the present invention further may include a water softener or decalcifier positioned in series in the hydraulic circuit, and the brine tank may be connectable to the water softener to supply brine thereto during a stage of regeneration thereof.

The electrochemical cell is connected in series in the hydraulic circuit at a position downstream of the position of connection of the brine tank to the hydraulic circuit. The brine tank preferably is connected to the hydraulic circuit by a conduit containing an electrovalve which is operated by a programmer of the machine such that at a predetermined time during the operating cycle of the machine brine is introduced from the brine tank into the hydraulic circuit and then is supplied by the hydraulic circuit to the electrochemical cell.

The electrochemical cell includes first and second electrode compartments for the production of chlorine gas and hydrogen gas. The two compartments are separated by a porous partition. The hydraulic circuit is connected to one of the compartments, and the two compartments are connected by an auxiliary conduit. The first and second compartments are connected to the interior of the wash tank by respective first and second conduits which thus form a downstream end of the hydraulic circuit. That compartment into which the hydraulic circuit empties has the gas supply conduit thereof extending into the wash tank at a level higher than that of the other gas supply conduit.

The electrodes of the two compartments of the cell are connected to a polarity reversing switch which connects the electrodes to terminals of a DC power source. By operating the switch it is possible to reverse the polarities of the two electrodes, for example in response to instructions from the programmer of the machine. This makes it possible to operate the two compartments alternately as anode and cathode compartments.

BRIEF DESCRIPTION OF THE DRAWING

Other objects, features and advantages of the present invention will be apparent from the following detailed description, taken with the accompanying drawing, wherein:

The single FIGURE is a schematic view of a dishwashing machine in accordance with the present invention.

DETAILED DESCRIPTION OF THE INVENTION

With reference now to the drawing, illustrated therein is a dishwashing machine including a wash tank 1 for the receipt of dishes or similar items to be washed and sprinkling elements 2 and 3 driven by a circulation pump 4. A discharge pump 5 evacuates the fluid contained in tank 1. The construction of these elements, including pumps 4 and 5, sprinkling elements 2 and 3 and the respective connections therebetween, may be by any known arrangement, but a preferable construction is disclosed in Italian Pat. No. 1,050,958, filed Sept. 24, 1975.

The wash tank 1 may be supplied with water, for example city water, through a hydraulic circuit 6 in which are provided in series a loading valve 7, for example an electric valve, an air gap 8, and a decalcifier or water softener 9. The dishwasher also has a brine tank or salt container 10 adapted to be supplied in a known manner with salt (sodium chloride) and adapted to be supplied through conduit 11 with measured amounts of water collected in a measuring tank 12. A construction of these elements may be according to any arrangement known in the art, but a preferable construction of tank 12 and gap 8 are as disclosed in Italian Utility Model Application No. 34036B/79 filed Nov. 15, 1979.

Salt container 10 has two outlets connected to hydraulic circuit 6, one outlet being upstream of decalcifier 9 and having an associated valve 13, and the other outlet being downstream of decalcifier 9 and having a valve 14. Valves 13 and 14 may be suitable valves, such as electric valves. Valves 13 and 14, as well as valve 7, may be controlled in a known manner, for example by the programmer of the machine.

Connected in series in the hydraulic supply circuit 6, at a location downstream of the connections between circuit 6 and salt container 10, is an electrochemical cell 15 positioned at a location near the bottom or base of the dishwasher. According to one important feature of the present invention, this electrochemical cell is of the type, known in itself, which is capable of producing chlorine gas by electrolysis of a sodium chloride solution. Cell 15 includes two electrode compartments 17, 18 separated from each other by a porous partition 16 or similar device.

Cell 15 includes electrodes 21, 23 which can be connected to a source of DC current which may be applied in a manner in itself known to terminals 24 and 25 during the electrolysis operation. Specifically, electrodes 21 and 23 may be connected to terminals 24 and 25 by means of a two-contact polarity reversing switch 22 which may be controlled by the programmer of the dishwashing machine. Thus, reversing switch 22 is capable of switching periodically and thereby reversing the polarity of electrodes 21 and 23 during a predetermined operating phase of the dishwasher. For example, such switching may occur repeatedly during a first rinsing stage normally provided in the operating cycle of the machine, or such switching may occur only once per operating cycle.

The cathode compartment of cell 15, i.e. alternately compartments 17 and 18 depending on the polarity of the voltage applied to electrodes 21 and 23, produces hydrogen, while the anode compartment produces chlorine gas. Compartments 17 and 18 are connected to the interior of wash tank 1 through respective conduits 61 and 62 which thereby form an end portion of the hydraulic circuit 6. The manner of connection of conduits 61 and 62 with the interior of tank 1 may be opposite a small collecting tank, as disclosed in European Patent Application No. 80102829.1 filed May 21, 1980. Preferably, conduits 61 and 62 extend vertically into tank 1, and the supply orifice of conduit 61 into tank 1 is at a level which is higher than that of conduit 62. According to another feature of the invention, the two electrode compartments 17 and 18 are interconnected by an auxiliary conduit 20. Preferably, conduits 61 and 62 extend from upper or top portions of compartments 17 and 18, and auxiliary conduit 21 connects bottom portions of the two compartments.

Wash tank 1 discharges into the atmosphere through a breather pipe 26 which in turn communicates in a known manner with a overflow device located within measuring tank 12.

The operation of those stages of the washing machine affected by the novel features of the present invention now will be described. It should be born in mind however that the overall operating cycle and the operating stages thereof, as well as the times of operation and the time periods of operation of the various components may be controlled directly by the program control of the machine, and that such easily may be regulated by one of ordinary skill in the art.

When water only is to be supplied into the wash tank 1, electrovalve 7 only is opened. Thus, the water from the water source, for example city water, is supplied along circuit 6 through valve 7 and air gap 8. The water is softened in decalcifier 9, and the resultant softened water continues through circuit 6 and enters compartment 17 and, through auxiliary conduit 20, compartment 18 of cell 15. The water continues to be supplied through conduits 61 and 62 into tank 1. Thus, when water only is supplied to the tank 1, the electrochemical cell 15 acts simiply as a widened portion of the hydraulic circuit 6. At the same time this water supply to tank 1 occurs, a portion of the water supply accumulates in a manner known in itself in measuring tank 12, and this water is supplied in a measured quantity via conduit 11 to brine tank 10.

Electrovalve 13 is opened only during a stage of regeneration of the ion exchange resins in decalcifier 9, for example at the end of the working cycle of the machine. At such time, valve 13 is opened, and water accumulated in tank 12 passes by gravity into brine tank 10, with the result that brine passes through valve 13 into decalcifier 9.

At a predetermined stage during the operating cycle of the machine, preferably after loading the water for a first conventional rinsing stage of the dishes, it is desired to introduce a chlorine gas as an oxidizing agent into the tank 1. To achieve this, electrovalve 14 is opened for a predetermined period of time. Accordingly, the water previously collected in tank 12 is caused by gravity to flow into salt container 10, thereby discharging brine through valve 14 and into circuit 6. As a result, brine is filled into compartments 17 and 18 of cell 15. Obviously, a corresponding amount of softened water which previously is present in cell 15 simultaneously is conveyed through conduits 61 and 62 into tank 1. It is to be noted that during this stage, due to the difference in levels of conduits 61 and 62, the brine entering compartment 17 of cell 15 moves more readily along auxiliary conduit 20, compartment 18 and conduit 62 thereby assuring that all of cell 15 is filled with brine.

During the desired predetermined stage of the operating cycle of the machine preferably during the first rinsing cycle, DC voltage is applied for a predetermined time, for example several minutes, to terminals 24 and 25, with the result that electrochemical cell is operated to cause electrolysis of the sodium chloride solution, i.e. brine, contained in the cell. For example, when the reversing switch 22 is in the position illustrated in the drawing, compartment 17 produces hydrogen which enters wash tank 1 through conduit 61. At the same time, compartment 18 produces chloride gas which enters the tank 1 through conduit 62 without the passage into the tank of sodium chloride.

During the rinsing stage of the machine, the interior of tank 1 is agitated due to the action of sprinkling elements 2 and 3, with the result that the chlorine gas which has been passed into the tank is absorbed by the rinse water and is immediately distributed over the wet surfaces of the dishes in order to effect the desired cleaning. It should be noted that the oxidizing effect of the chlorine, due to the fact that the chlorine/water solution is slightly acidic, is accompanied by a dissolution process of any calcium carbonate film which may be present on the surfaces of the dishes. Furthermore, due to the relatively small quantity of water in which the chlorine gas is absorbed, the chlorine gas can be passed into the wash tank in minimal amounts, yet with optimum concentration. Thus, and also due to the particular and unique characteristics of the electrochemical cell 15 which produces chlorine gas and does not require any special cooling systems, the electrochemical cell occupies a relatively small space and consumes relatively little electric power.

Furthermore, in accordance with the present invention, no measuring or metering devices are required to pass the chlorine gas into the tank. The admission of the chlorine gas into the tank, in a condition free from sodium chloride, takes place simultaneously with the production of the chlorine gas in the cell 15. The present invention thus provides the advantages of not requiring any equipment for passage of the oxidizing agent to the wash tank of the machine, and also that sodium chloride is prevented from passing to the wash tank.

After subjecting the dishes to the action of the chlorine, at least one admission and discharge cycle of the water is preformed, in the manner described above, while maintaining circulation pump 4 deactivated. This makes it possible to remove any residual brine from the electrochemical cell and to discharge such brine from the wash tank. As a result, residual brine has no significant effect on the successive conventional rinsing cycles through which any chlorine still present on the surfaces of the dishes is greatly diluted and then discharged.

As mentioned above, the chlorine gas and hydrogen gas are produced by the electrochemical cell 15 in such small quantities that potential leaks do not pose any danger to the user. More specifically, the chlorine and the hydrogen are immediately diluted in tank 1 with water and air in such quantities as to preclude any danger of explosion or toxicity.

Another advantage of the dishwashing machine according to the present invention is the fact that the reversing switch 22 is capable of periodically reversing the polarity of the DC voltage applied to electrodes 21 and 23 of cell 15. This means that compartments 17 and 18 of the cell 15 each can serve alternately as anode and cathode compartments during an electrolysis operation. This alternating of the current flow during the electrolysis operation automatically eliminates potential incrustations which otherwise would tend to form on the electrodes.

The above features, together with the serial connection of the electrochemical cell 15 with the hydraulic supply circuit of the dishwasher, ensure periodic cleaning of the cell and result in improved operational reliability.

From the above description, it also will be apparent that the dishwasher according to the present invention does not require any additional electric valves or other valves in the hydraulic circuit, with the result that the entire machine operates simply and reliably.

Although the present invention has been described and illustrated with respect to a preferred embodiment thereof, it is to be understood that the specifically described and illustrated features may be modified as will be apparent to those skilled in the art without depating from the scope of the present invention. For example, the production and admission of the chlorine gas into the wash tank may take place in a cycle different from the operating cycle during which a minimum amount of water is present in the tank. Furthermore, the two compartments 17 and 18 of the electrochemical cell 15 may be completely separated from each other by providing auxiliary conduit 20 with an electrovalve appropriately controlled by the program control of the machine.

We claim:

1. A dish washing machine comprising:
   a wash tank for receipt of dishes to be washed;
   a hydraulic circuit for receiving water from a water supply source and for supplying the water to said wash tank;
   an electrochemical cell means for generating chlorine gas by the electrolysis of a brine solution, said electrochemical cell being connected to said hydraulic circuit;
   salt container means, connected to said hydraulic circuit by at least one valve, for forming brine and supplying brine to said electrochemical cell means;
   at least one chlorine gas supply conduit connecting said electrochemical cell means to said wash tank for supplying chlorine gas from said electrochemical cell means to the interior of said wash tank; and
   said electrochemical cell means being connected in series with said hydraulic circuit at a position downstream of the position of connection of said salt container means to said hydraulic circuit.

2. A machine as claimed in claim 1, wherein said electrochemical cell means includes first and second electrode compartments for the production of chlorine gas and hydrogen gas, said first and second electrode compartments are separated by a porous partition, said hydraulic circuit is connected to one of said first and second electrode compartments, said first and second electrode compartments are connected by an auxiliary conduit, and said first and second electrode compartments ar connected to the interior of said wash tank by respective first and second conduits which form a downstrean end of said hydraulic circuit.

3. A machine as claimed in claim 2, wherein said one electrode compartment comprises said first electrode compartment and said first conduit extends into said wash tank to a level higher than that of said second conduit.

4. A machine as claimed in claim 2, further comprising first and second electrodes in said first and second electrode compartments, respectively, and polarity reversing switch means, connected to said first and second electrodes, for connecting said electrodes to terminals of a DC power source, and for reversing such connection, thereby reversing the polarities of said electrodes, in response to a program control of the machine.

5. A machine as claimed in claim 2, wherein said first and second conduits are connected to upper portions of said first and second electrode compartments, respectively, and said auxiliary conduit is connected to lower portions of said first and second electrode compartments.

6. A machine as claimed in claim 1, further comprising decalcifying means positioned in series in said hydraulic circuit for softening the water supplied to said wash tank, and means for selectively supplying brine from said salt container means to said decalcifying means during a stage of regeneration thereof, said supplying means comprising a conduit from said salt container means to said hydraulic circuit at a position upstream of said decalcifying means, and an electrovalve in said conduit and adapted to be operated by a program control of the machine.

7. A machine as claimed in claim 1, wherein said salt container means is connected to said hydraulic circuit by a conduit, and said at least one valve comprises an electrovalve in said conduit and adapted to be operated by a program control of the machine, such that at a predetermined time during the operating cycle of the machine brine is introduced from said salt container means into said hydraulic circuit and then is supplied to said electrochemical cell means.

8. A machine as claimed in claim 1, further comprising polarity reversing switch means, connected to electrodes of said electrochemical cell means, for connecting said electrodes to terminals of a DC power source, and for reversing such connection, thereby reversing the polarities of said electrodes, in response to a program control of the machine.

* * * * *